United States Patent [19]

Kataoka

[11] Patent Number: 4,729,084
[45] Date of Patent: Mar. 1, 1988

[54] INVERTER APPARATUS
[75] Inventor: Michio Kataoka, Kobe, Japan
[73] Assignee: Mitsubishi Denki Kabushiki Kaisha, Japan
[21] Appl. No.: 49,310
[22] Filed: May 13, 1987
[30] Foreign Application Priority Data
  May 19, 1986 [JP] Japan .................. 61-116356
[51] Int. Cl.[4] .......................... H02H 7/122
[52] U.S. Cl. .................... 363/56; 363/80; 363/98; 363/132; 363/136; 361/83; 361/100
[58] Field of Search ............ 363/17, 27, 56, 57, 363/58, 80, 95, 98, 132, 136; 361/83, 100

[56] References Cited
U.S. PATENT DOCUMENTS
  3,919,621 11/1975 Wechsler .................. 363/57
  4,428,016 1/1984 Brasfield ................. 361/100
  4,597,026 6/1986 Santurtûn et al. .......... 361/100

Primary Examiner—Patrick R. Salce
Assistant Examiner—Anita M. Ault
Attorney, Agent, or Firm—Leydig, Voit & Mayer

[57] ABSTRACT

An inverter having an output connected to a load through a reactor and an output filter capacitor terminal voltage of the capacitor is monitored, and an interlock operation for interrupting the delivery of the inverter transistor drive signals is released when the terminal voltage does not exceed a predetermined level. When the interlock operation for cutting off the drive signals of the transistors has started and continued for a predetermined time, it is further continued when the terminal voltage of the output filter capacitor does not drop below a set level and is released for the first time when the output filter capacitor is sufficiently discharged to render the terminal voltage the set level or below.

2 Claims, 4 Drawing Figures

INVERTER APPARATUS

BACKGROUND OF THE INVENTION

This invention relates to an inverter apparatus comprising a circuit which interrupts the delivery of drive signals to an inverter so as to protect the constituent elements of the inverter from overcurrents.

FIG. 2 shows a prior-art inverter apparatus of this type in terms of a circuit diagram. Referring to the figure, letter E indicates a D.C. power source, and numeral 1 designates a capacitor for suppressing a D.C. voltage ripple. Numerals 2-5 designate transistors constituting an inverter INV, and numerals 6-9 free-wheel diodes. Numeral 10 denotes an output transformer, numeral 11 a reactor for improving a waveform, numeral 12 an output filter capacitor, and numeral 13 an A.C. load. Numeral 14 denotes a current detector CT, numeral 15 an inverter overcurrent detecting circuit, numeral 16 a one-shot multivibrator, numeral 17 a base signal generating circuit, numeral 18 an interlock circuit, and numeral 19 a base drive circuit, and a control circuit for the inverter is constructed of the portions 14-19.

Next, the operation of this inverter apparatus will be explained.

When the output current of the inverter INV, namely, a current flowing through the current transformer 14 is not greater than an allowable value, the inverter overcurrent detecting circuit 15 is not actuated, and a base signal produced by the base signal generating circuit 17 is supplied to the base drive circuit 19. Upon receiving base drive signals from the base drive circuit 19, the transistors 2-5 perform on/off operations in a predetermined sequence and feed a single-phase alternating current to the A.C. load 13. Since the single-phase A.C. output is a rectangular wave alternating current, it is passed through the output transformer 10 and is thereafter subjected to waveform shaping by means of the reactor 11 as well as the output filter capacitor 12. Thus, the shaped output is fed to the A.C. load 13.

Here, when the load 13 falls into an overload state, the inverter overcurrent detecting circuit 15 is actuated to supply the one-shot multivibrator 16 with an overcurrent detection signal (trigger pulse). Then, the one-shot multivibrator 16 delivers a pulse signal of predetermined time width to the interlock circuit 18. Therefore, while this pulse signal is delivered, the interlock circuit 18 cuts off the supply of the base signal produced by the base signal generating circuit 17, to the base drive circuit 19. Incidentally, the time width of the pulse signal which the one-shot multivibrator 16 produces is previously set in consideration of the characteristics of the A.C. load 13, etc.

In this way, the transistors being the constituent elements of the inverter and the free-wheel diodes connected in parallel with them are protected from overcurrents. In the inverter apparatus of this type having the output filter capacitor 12, however, when the base signal is cut off, a case shown in FIG. 3 where the output filter capacitor 12 stores charges in an illustrated polarity occurs to give rise to a mode in which current circulates through the free-wheel diodes as indicated by arrows in solid lines. When, under such a state, the interlock operation of the interlock circuit 18 is released to supply the transistors of the inverter INV with the base drive signals, the stored charges of the output filter capacitor 12 incur a mode in which current flows along the transformer 10—the transistor 3 turned 'on'—the free-wheel diode 9 as indicated by arrows of solid lines in FIG. 4, that is, a reactor short-circuit mode. This has posed the problem that a situation leading to the breakdown of the transistor or/and the diode ascribable to an overcurrent takes place.

SUMMARY OF THE INVENTION

This invention has been made in order to eliminate the problem of the prior art stated above, and has for its object to provide an inverter apparatus which can heighten the reliability of protection from overcurrents as compared with the prior art.

To the accomplishment of the object, this invention consists in a construction in which the terminal voltage of the output filter capacitor of an inverter is monitored, and an interlock operation for interrupting the delivery of transistor drive signals is released on condition that the terminal voltage does not exceed a predetermined level.

In this invention, when the interlock operation for cutting off the drive signals for the inverter has started and continued for a predetermined time, it is further continued on the occasion that the terminal voltage of the output filter capacitor does not lower down to the set level, and it is released for the first time on the occasion that the charges of the output filter capacitor are sufficiently discharged to render the terminal voltage the set level or below. Therefore, it is not feared that an overcurrent will flow immediately after the release of the interlock operation, to break down a transistor or-/and a diode.

BRIEF DESCRIPTION OF THE DRAWINGS

Throughout the drawings, the same symbols indicate identical or corresponding portions.

DESCRIPTION OF THE PREFERRED EMBODIMENT

Now, an embodiment of this invention will be described with reference to the drawings.

Figure 1:
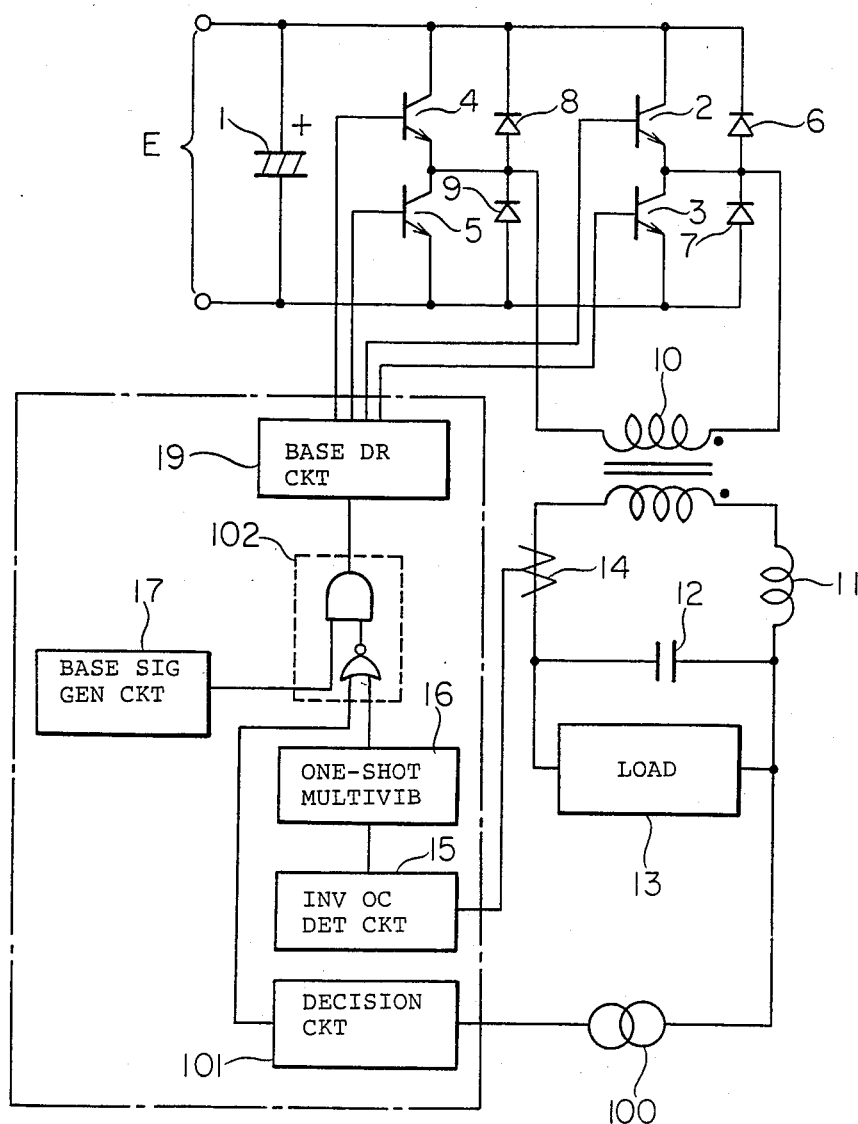
FIG. 1 is a circuit diagram showing an embodiment of this invention.
Figure 2:
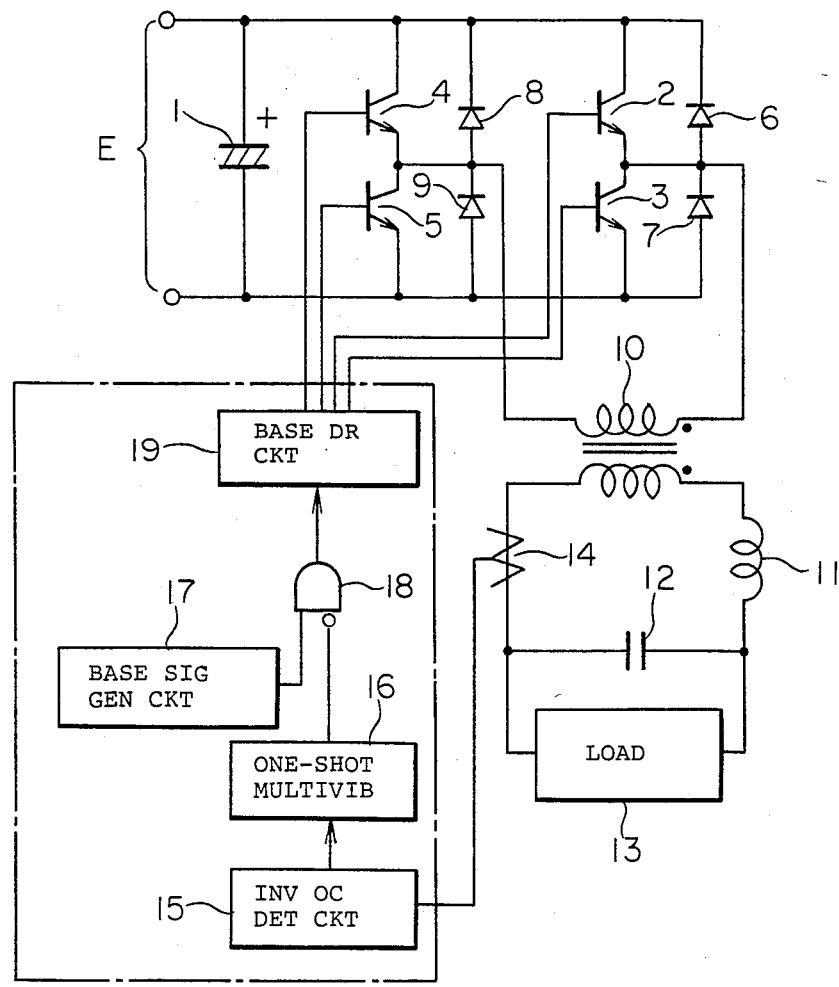
FIG. 2 is a circuit diagram showing a prior-art inverter apparatus.
Figure 3:
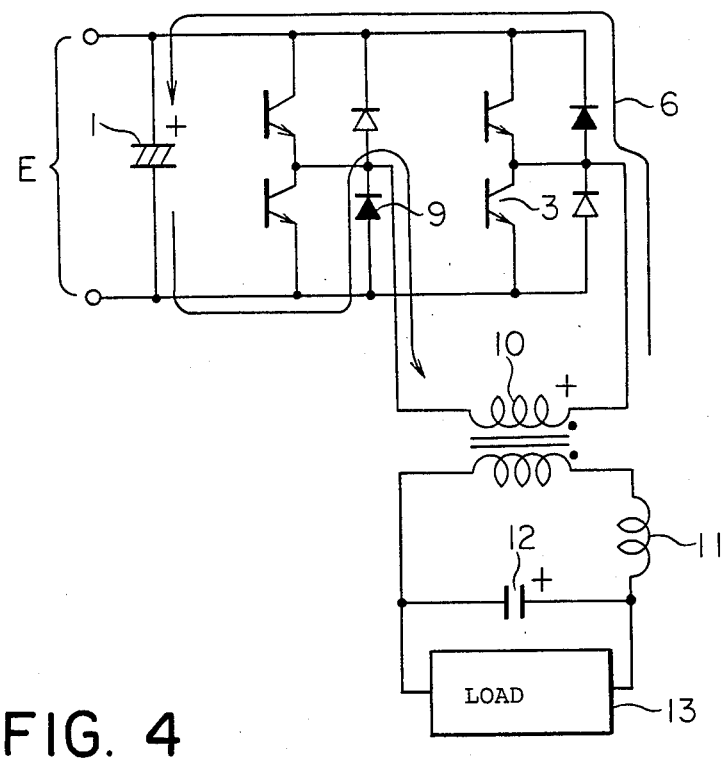
FIG. 3 is a circuit diagram for explaining a current mode which proceeds after the cut-off of base drive signals in the prior-art example.
Figure 4:
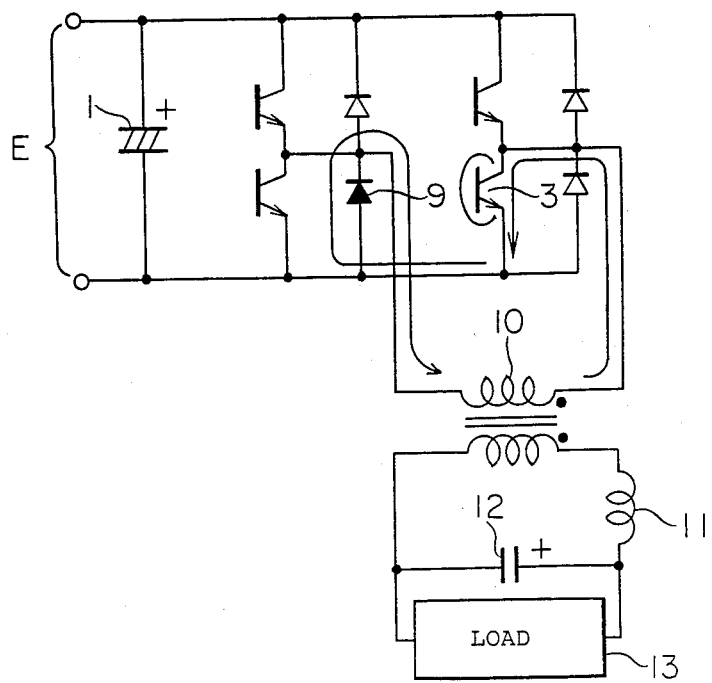
FIG. 4 is a circuit diagram for explaining a current mode which proceeds after the release of the operation of cutting off the base drive signals in the prior-art example.

In FIG. 1, numeral 100 designates a voltage detecting circuit PT for detecting the terminal voltage of an output filter capacitor 12. Numeral 101 designates a decision circuit, into which the voltage detection signal of the voltage detecting circuit 100 is introduced. In a case where the voltage detection signal is greater than a set voltage (for example, ⅓ of a rated voltage), the decision circuit 101 sends a signal to an interlock circuit 102. The interlock circuit 102 is supplied with both the signal of the decision circuit 101 and an interlock signal sent by a one-shot multivibrator 16 and performs an interlock operation during the reception of both the signals, thereby to cut off the supply of a base signal produced by a base signal generating circuit 17 to a base drive circuit 19. Since the remaining construction is the same as in the prior-art apparatus of FIG. 2, corresponding portions are assigned identical symbols and shall be omitted from description.

In this construction, when the output current of the inverter INV, namely, a current flowing through the current transformer 14 is not greater than an allowable value, the inverter overcurrent detecting circuit 15 is not actuated to trigger the one-shot multivibrator 16. Therefore, the interlock operation of the interlock circuit 102 is held released, and the base signal which the base signal generating circuit 17 delivers is supplied to the base drive circuit 19. Thus, as in the prior art, the transistors 2–5 receive base drive signals from the base drive circuit 19 and perform on/off operations in a predetermined sequence so as to feed the A.C. load 13 with a single-phase alternating current.

When the A.C. load 13 falls into an overload state, the inverter overcurrent detecting circuit 15 is actuated to supply the one-shot multivibrator 16 with an overcurrent detection signal. Then, the one-shot multivibrator 16 delivers the pulse signal (interlock signal) of predetermined time width to the interlock circuit 102. Whether or not the overcurrent state has disappeared is indicated by only the pulse from the one-shot multivibrator. Should the overcurrent state continues, the interlock signal continue to be provided. Therefore, during the delivery of the pulse signal, the interlock circuit 102 cuts off the supply of the base signal produced by the base signal generating circuit 17, to the base drive circuit 19. In the prior-art construction of FIG. 2 described before, when the pulse signal has vanished, the cut-off of the supply of the base signal to the base drive circuit 19 is released, and the operation of the inverter is restarted. In contrast, in this embodiment, the voltage state of the output filter capacitor 12 is considered as a condition for releasing the interlock operation. More specifically, in a case where a voltage higher than the set voltage of the output filter capacitor 12 is remaining at the time of the vanishing of the pulse signal from the one-shot multivibrator 16, the decision circuit 101 is sending a decision signal, and hence, the interlock operation of the interlock circuit 102 is continued. The cut-off of the supply of the base signal to the base drive circuit 19 is released for the first time when the residual charges of the output filter capacitor 12 have been discharged to bring the terminal voltage value of this capacitor to or below the set voltage.

That is, according to the embodiment, the base cut-off time previously set for protecting the inverter from an overcurrent is prolonged depending upon the charge storing state of the output filter capacitor 12. By properly selecting the set voltage of the decision circuit 101, therefore, it is permitted to release the base cut-off after the stored charges have been sufficiently discharged. It is accordingly possible to prevent the overcurrent breakdown of the transistors 2–5 or/and the free-wheel diodes 6–9 attributed to the charges of the output filter capacitor 12 as otherwise occurs immediately after the release of the base cut-off.

In the embodiment, the interlock operation is not released unless the base cut-off time previously set lapses. However, a construction is also possible in which, when the voltage of the output filter capacitor 12 has dropped to the set voltage or less within the base cut-off time, the interlock operation is released in synchronism with the voltage drop, thereby to shorten the operation interruption time of the inverter.

Although, in the foregoing embodiment, the transistors have been used as semiconductor switching elements constituting the inverter, this invention can attain a similar effect when applied to an inverter which is constructed of selfextinguishing elements such as gate turn-off thyristors or field-effect transistors.

Besides, although the one-shot multivibrator has been employed for setting the base cut-off time, i.e., the interlock time, it can be replaced with a timer to attain a similar effect.

Although the foregoing embodiment has referred to the single-phase inverter, this invention can attain a similar effect when applied to a multiphase inverter.

As described above, this invention is so constructed that the voltage condition of an output filter capacitor is considered as a requisite for releasing the operation of cutting off drive signals at the occurrence of an overcurrent, whereby a short-circuit mode ascribable to the stored charges of the capacitor to arise immediately after the release of the cutting-off operation can be prevented from being formed, so that the reliability of the protection of an inverter against overcurrents can be sharply enhanced over the prior art.

What is claimed is:

1. In an inverter apparatus wherein an output of an inverter is fed to a load through a reactor and a capacitor for shaping a waveform, and wherein a control circuit which supplies the inverter with drive signals includes means to detect an overload of the inverter and to perform an interlock operation for interrupting delivery of the drive signals during the overload; an inverter apparatus characterized by monitoring a terminal voltage of said capacitor, and releasing the interlock operation on condition that the terminal voltage does not exceed a predetermined level.

2. An inverter apparatus according to claim 1, wherein the interlock operation is not released until a preset fixed time lapses after the detection of the overload of said inverter and the voltage said capacitor is below a predetermined value.

* * * * *